June 6, 1950  J. W. HESS ET AL  2,510,175
CLOTHES HANGER SUPPORT FOR AUTOMOBILES
Filed July 19, 1946
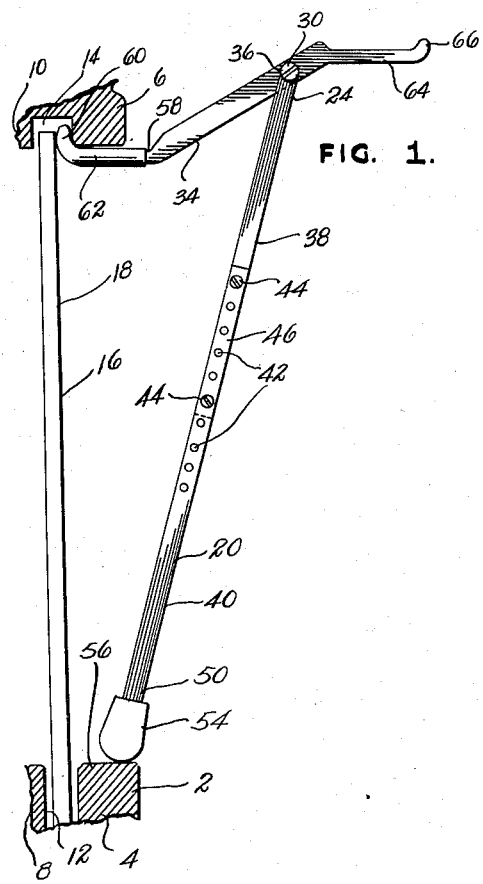
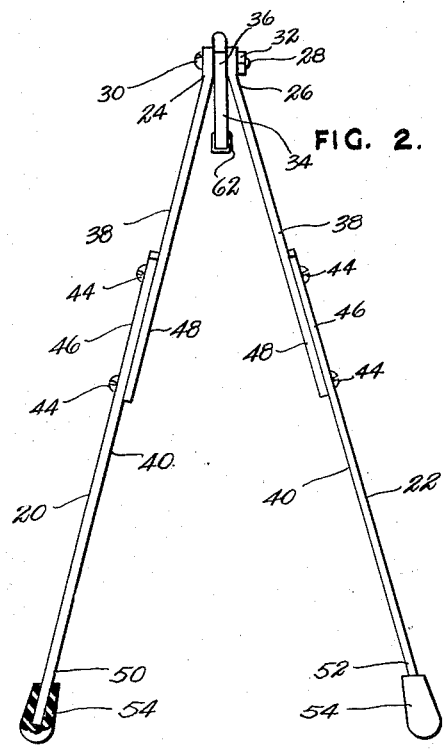
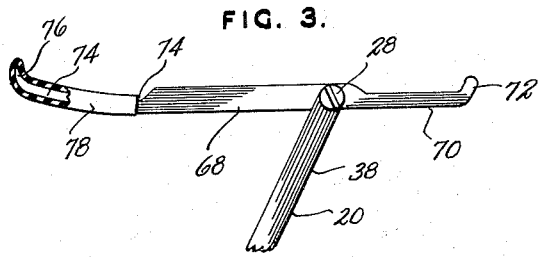
INVENTOR.
JAMES W. HESS &
CLYDE W. BISHOP,
BY
ATTORNEYS.

Patented June 6, 1950

2,510,175

UNITED STATES PATENT OFFICE 2,510,175

CLOTHES HANGER SUPPORT FOR AUTOMOBILES

James W. Hess, Glendale, Calif., and Clyde W. Bishop, Shelton, Wash.

Application July 19, 1946, Serial No. 684,828

2 Claims. (Cl. 224—42.45)

This invention relates to supports.

An object of the invention is to provide a device for hanging clothes and other articles in automobiles and similar vehicles during use thereof.

Another object of the invention is to provide an automobile clothes hanger which is simple in design, attractive in appearance, and which is inexpensive to manufacture.

A further object of the invention is to provide an automobile clothes hanger which is adaptable for installation in all popular makes of automobiles of practically every model, both two door and four door types, without making any changes in the automobile, or impairing its appearance.

Other objects and advantages of the invention will become apparent from the following description of a preferred embodiment thereof as illustrated in the accompanying drawings, and in which:

Figure 1 is a side elevation of our improved clothes hanger installed in position in an automobile.

Figure 2 is an end elevation of the clothes hanger as seen from the right hand side of Figure 1, and apart from the automobile, and Figure 3 is a fragmentary side elevation of a modified form of the clothes hanger which is particularly adapted for use in four door car models.

Referring now to Figures 1 and 2, it will be seen that there is an automobile door 2 having a door body 4, side rails and a top rail 6, with outer moldings as at 8 and 10 defining channels as at 12 and 14 within which the edges of a window pane 16 are supported as it moves upward and downward to open and close the window opening 18. It is proposed to install the clothes hanger in a window such as one like that illustrated in Figure 1.

As shown, the clothes hanger includes two upright supports or legs 20 and 22 which are secured together at their upper ends 24 and 26 by means of a bolt 28 having a head 30 and a nut 32, the upper ends of the legs being bent into parallelism along that portion through which the bolt 28 extends, appropriate holes being formed therein for passage of the bolt.

A third member or lever 34 has a portion 36 thereof extending between the parallel upper ends of the leg members 20 and 22, the portion 36 being suitably apertured to allow for passage of the shank of the bolt 28 therethrough, whereby the members 20, 22, and 34 are held together by the bolt 28, which serves as a pivot pin for the member 34 relative to the legs 20 and 22.

The leg members 20 and 22 are divided into upper portions 38 and lower portions 40, each portion having a number of apertures 42 formed therein for the reception of fastening bolts or screws 44, which serve to fasten together the overlapping ends 46 and 48 of the members 40 and 38 respectively, when the corresponding holes are brought into registry. In this manner the overall length or height of the legs 20 and 22 may be adjusted to fit the size of the auto window.

The legs 20 and 22 diverge downwardly, as best shown in Figure 2, with their lower ends 50 and 52 covered by rubber caps 54 adapted to rest upon the upper surface 56 of window sill 2 of the automobile window, the rubber caps preventing scratching or marring of the car finish, and preventing slipping of the legs thereon.

The cross arm or lever 34 has a forward reduced extension 58 bent upward at 60 to form an upturned hook for engaging in the channel 14 shown in Figure 1, the extension 58 being covered by a rubber boot 62 which prevents scratching of the car finish and prevents slipping of the parts. The rearward extension 64 of the cross arm 34, forms the clothing hook or support and its end 66 is bent upward to form a hook to hold clothes against sliding off.

Figure 3 shows a modified form of the cross arm as at 68, which is substantially straight rather than bent as is cross arm 34. The arm 68 is similarly pivoted on pin 28 between the upper ends of legs 20 and 22, and has a rearward extension 70 which is hooked at 72, and a forward extension 74 which is hooked at 76 for engaging a window rail as in Figure 1, the rubber boot 78 protecting against marring of the car finish.

It is thus apparent that we have disclosed a clothes hook which is adaptable for use in automobiles of various types, and which is adjustable to different sizes of windows. Although we have described preferred embodiments of our invention in specific terms, it is to be understood that various changes may be made in size, shape, materials and arrangement without departing from the spirit and scope of the invention as claimed.

We claim:

1. A clothes hanger for mounting on a window frame having upper and lower horizontal members, said hanger comprising a generally horizontal arm having a clothes hook on one end and an upwardly directed anchoring hook on its opposite end, said anchoring hook being arranged to be engaged with the underside and behind the upper window frame member with said clothes hook projecting inwardly from the window frame, a pivot bolt traversing said arm at a point intermediate its ends, and two vertically elongated legs having their upper ends pivoted on said bolt and having feet on their lower ends to rest upon the upper side of said lower window frame member, said legs diverging from each other toward their lower ends being swingable on said bolt independently of each other and of said arm to enable said legs to be positioned in the same or in different planes declining toward the lower window frame member to place their feet upon spaced points of the upper side of the lower window frame member, and clamping means associated with said pivot bolt for clamping said arm and said legs together in adjusted relation.

2. A clothes hanger for mounting on a window frame having upper and lower horizontal members, said hanger comprising a generally horizontal arm having a clothes hook on one end and an upwardly directed anchoring hook on its opposite end, said anchoring hook being arranged to be engaged with the underside and behind the upper window frame member with said clothes hook projecting inwardly from the window frame, a pivot bolt traversing said arm at a point intermediate its ends, and two vertically elongated legs having their upper ends pivoted on said bolt and having feet on their lower ends to rest upon the upper side of said lower window frame member, said legs diverging from each other toward their lower ends being swingable on said bolt independently of each other and of said arm to enable said legs to be positioned in the same or in different planes declining toward the lower window frame member to place their feet upon spaced points of the upper side of the lower window frame member, and clamping means associated with said pivot bolt for clamping said arm and said legs together in adjusted relation, each of said legs comprising two longitudinally extensible sections and means for locking the sections together in extended or contracted relation, whereby the length of said legs can be independently adjusted to position their feet upon the upper side of the lower window frame member.

JAMES W. HESS.
CLYDE W. BISHOP.

REFERENCES CITED

The following references are of record in the file of this patent:

UNITED STATES PATENTS

| Number | Name | Date |
|---|---|---|
| 28,525 | Warth | May 29, 1860 |
| 275,481 | Gould | Apr. 10, 1883 |
| 547,918 | Gates | Oct. 15, 1895 |
| 652,010 | Wheeler | June 19, 1900 |
| 811,514 | Mills | Jan. 30, 1906 |
| 1,083,192 | Cooper | Dec. 30, 1913 |
| 1,452,182 | Butrum | Apr. 17, 1923 |
| 2,064,087 | Smith | Dec. 15, 1936 |
| 2,144,772 | Plants | Jan. 24, 1939 |
| 2,157,001 | Morley | May 2, 1939 |
| 2,454,368 | Auskelis et al. | Nov. 23, 1948 |